United States Patent [19]
Fletcher, Sr.

[11] Patent Number: 5,171,437
[45] Date of Patent: Dec. 15, 1992

[54] IN-TANK AQUARIUM FILTER

[76] Inventor: Orman J. Fletcher, Sr., 212 E. Edinger Ave., Santa Ana, Calif. 92707

[21] Appl. No.: 769,176

[22] Filed: Sep. 30, 1991

[51] Int. Cl.$^5$ .............................................. A01K 63/04
[52] U.S. Cl. ........................................ 210/169; 119/5; 210/484; 210/490
[58] Field of Search ............ 210/169, 416.2, 483, 210/484, 490, 486, 488; 119/5

[56] References Cited

U.S. PATENT DOCUMENTS

| | | | |
|---|---|---|---|
| 3,119,774 | 1/1964 | Arak | 119/5 |
| 3,295,687 | 1/1967 | Schmerler | 210/486 |
| 3,464,562 | 9/1969 | Meyers et al. | 210/486 |
| 3,515,097 | 6/1970 | Sherman | 119/5 |
| 3,529,574 | 9/1970 | Kelley | 119/5 |
| 3,827,560 | 8/1974 | Morton | 210/169 |
| 3,855,970 | 12/1974 | Harwood | 119/5 |
| 3,867,292 | 2/1975 | Cornell | 210/169 |
| 4,025,431 | 5/1977 | Saxton | 210/169 |
| 4,035,298 | 7/1977 | Cloke et al. | 210/169 |
| 4,098,230 | 7/1978 | Jackson | 210/169 |
| 4,123,359 | 10/1978 | Smith | 210/169 |

Primary Examiner—Peter Hruskoci
Assistant Examiner—Robert James Popovics

[57] ABSTRACT

An aquarium filter which is positioned within the aquarium tank on top of and in direct contact with a means of support so that the filter is upwardly disposed from the bottom of the aquarium tank to form a fluid chamber between said means and the bottom of the aquarium tank. A section of permeable synthetic filter material interposes a lower filter member and an upper filter member and the whole thereof is encased in a section of synthetic screen material. A conventional pump assembly is provided as a means for recirculating water through the aquarium filter whereby waste material and debris are collected within said filter and eliminated by natural decay. The movement of water through the aquarium filter also causes air bubbles to collect within said filter thus providing a source for continual passive aeration of the aquarium water.

1 Claim, 2 Drawing Sheets

IN-TANK AQUARIUM FILTER

BACKGROUND OF THE INVENTION

1. Field of the Invention

This invention relates generally to filters and, more particularly to aquarium filter devices for use within saltwater and freshwater aquariums.

2. Description of the Prior Art

It is generally understood that to maintain the health and vitality of the animals confined to an aquarium, provision must be made for continuous filtration, aeration and recirculation of the aquarium water. It is further understood that three types of filtration processes are necessary to maintain optimum environmental conditions within the aquarium, namely: chemical filtration to remove dissolved organics; mechanical filtration to remove suspended matter; and biological filtration which utilizes beneficial bacteria to neutralize toxic substances within the aquarium water.

A number of differently configured aquarium filter systems have been devised in an attempt to meet these needs. One such system is the external aquarium filter in which a filter housing is located outside the aquarium tank, either beneath the tank floor or adjacent to the tank sidewall and depended from the upper edge thereof.

A typical external filter system consists of an electrically powered pump, intake and return lines, a filter housing containing activated charcoal overlaid with one or more layers of synthetic filter medium, and a means for aerating the aquarium water. As water is siphoned out of the aquarium tank via an inlet tube, it moves through the filter housing inlet chamber into the central housing chamber where it passes through the filter medium into the housing outlet chamber and is pumped back into the aquarium via the return line.

Although the external filter device is generally adequate for providing chemical and mechanical filtration, the filter material utilized in such a device is not sufficient to support the large colony of bacterial growth needed to achieve optimum biological filtration. Another problem with the external aquarium filter is that it clogs rapidly and must be frequently changed to maintain the quality and clarity of water within the aquarium.

Another type of aquarium filter system presently in use is the underwater aquarium filter, specifically designed for placement within the aquarium tank. This type of system is comprised of inlet and outlet tubes, a pumping device, a means for aerating the aquarium water, and a filter housing composed of inlet and outlet chambers and a central chamber for containment of a filter medium such as activated charcoal overlaid with one or more layers of synthetic filter media. Water from the aquarium is pumped through the inlet tube to the filter housing where it passes from the inlet chamber through the filter medium in the central chamber to the outlet chamber and exits the housing for return to the aquarium tank via the outlet tube.

One problem inherent in the underwater aquarium filter concerns its size. Since such a system is dimensionally configured so as to be unobtrusive when placed within the aquarium tank, its filter housing is relatively small. Therefore, the volume of filter material contained within the housing is generally not sufficient to provide adequate mechanical filtration nor can it support a large enough colony of desireable bacteria to provide effective biological filtration. Another problem with this type of system is that the filter medium clogs very quickly and must be frequently replaced. Further, because the filter is positioned underwater within the aquarium tank, the filter housing must be physically separated from the system and removed from the aquarium tank to accomplish replacement of the filter medium; a procedure which disturbs the aquarium environment and interrupts the entire filtering process.

A third type of aquarium filter is known as the undergravel filter. This type of system employs a perforated filter element positioned at the bottom of the aquarium tank. A layer of aquarium gravel is distributed across the top surface of the filter element to provide biological and mechanical filtration of the aquarium water. A pumping device and means for aerating the aquarium water are also provided. When the pumping device is activated, water from the upper region of the aquarium moves downward through the gravel and through the perforations in the filter element. After passing through the filter element to the bottom of the aquarium tank, water is drawn into a recirculation tube and discharged back into the upper region of the tank.

The efficiency of an undergravel filter device is dependent upon its ability to permit the water circulating through the aquarium tank to flow freely and evenly through the perforations in the device's filter element. However, since the filter element utilized in most currently patented undergravel filter systems is comprised of a thin section of synthetic material containing a number of spaced apart perforations, water flow through the element is restricted to the areas of perforation resulting in uneven water flow, impaired filtration, rapid growth of harmful algae and the accumulation of untreated wastes within the aquarium tank. Additionally, as untreated wastes accumulate in the gravel overlying the filter element, the gravel "packs" creating dead spots through which water cannot circulate. And, since harmful algae and solid waste materials also accumulate on the filter element, the entire system must be frequently removed from the aquarium for cleaning; a labor intensive process that necessitates the removal of all animals from the aquarium tank.

Another difficulty encountered with the use of currently available undergravel filter systems is the lengthy break-in time required to stabilize the pH of the aquarium water before animals may be safely placed within the aquarium tank; typically 5 to 6 weeks. In addition, each time the filter system is removed from the aquarium for cleaning, the colony of desireable bacteria contained in the gravel is destroyed making it necessary to repeat the break-in process before animals may be safely returned to the aquarium.

Another disadvantage noted in existing undergravel filter devices is that they are not suitable for use in specialized aquariums such as saltwater reef tanks and coral tanks, nor can they be easily and inexpensively manufactured to fit within spherical or other unusually configured aquarium tanks.

SUMMARY OF THE INVENTION

Several objects and advantages of my invention are:
(a) to provide an in-tank aquarium filter suitable for use in both saltwater and freshwater aquariums;
(b) to provide an in-tank aquarium filter capable of achieving effective biological and mechanical filtration of the aquarium water without the addition of an overlying layer of gravel of other filter material;

(c) to provide an in-tank aquarium filter that increases oxygenation of the aquarium water via passive aeration;

(d) to provide an in-tank aquarium filter in which improved circulation and increased aeration of the water permits a significant increase in the number of animals that may be maintained within the aquarium in good health;

(e) to provide an in-tank aquarium filter capable of significantly reducing aquarium tank break-in time;

(f) to provide an in-tank aquarium filter whereby the frequency and degree of aquarium tank maintenance is significantly reduced;

(g) to provide an in-tank aquarium filter that can be used as an adjunctive filter in combination with currently available in-tank and undergravel aquarium filter systems to improve the performance thereof;

(h) to provide an in-tank aquarium filter that can be used as a biological filtration adjunct to currently available external aquarium filter systems to improve the performance thereof;

(i) to provide an in-tank aquarium filter that can be easily and inexpensively adapted for use in aquariums of any configuration.

The aforementioned objects and advantages will become apparent from a consideration of the ensuing description and drawings.

BRIEF DESCRIPTION OF THE DRAWINGS

In the drawings, closely related figures have the same number but different alphabetical suffixes.

Figure 1:
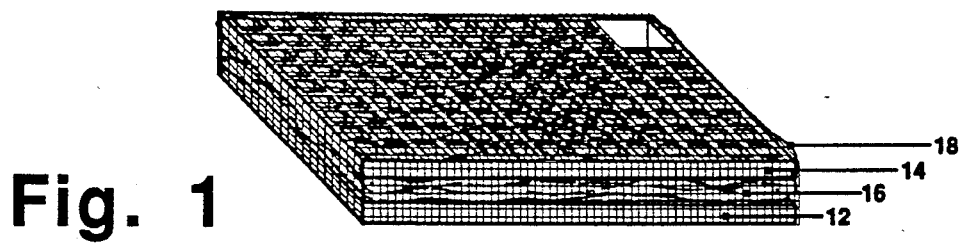
FIG. 1 is a perspective drawing of the in-tank aquarium filter of the present invention.

REFERENCE NUMERALS USED IN DRAWINGS 10 aquarium tank
12 lower filter member
14 upper filter member
16 filter material
18 screen material
24 fluid chamber
26 bottom connector section
28 water/air carrying member
30 air tubing
32 airstone
34 upper connector section
36 aquarium gravel

DESCRIPTION OF THE PREFERRED EMBODIMENT

Figure 2:
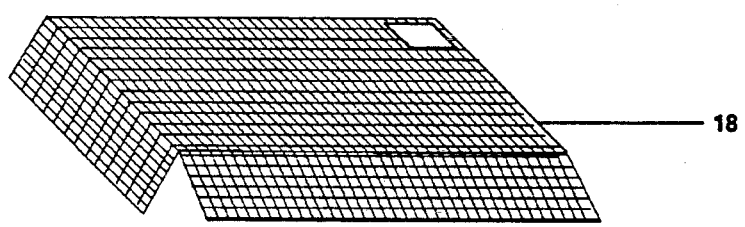
FIG. 2 is an exploded perspective drawing of the in-tank aquarium filter in FIG. 1.
Figure 2:
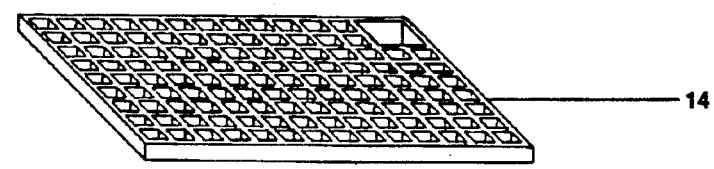
Figure 2:
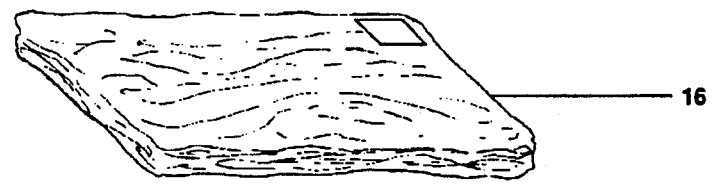
Figure 2:
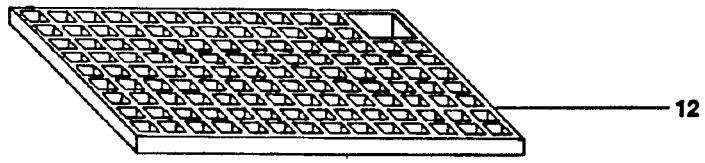

In the preferred embodiment of the in-tank aquarium filter of the present invention, as illustrated in FIGS. 1 and 2, lower filter member (12) and upper filter member (14) are comprised of commercially available rigid synthetic grid material cut to fit the internal dimensions of aquarium tank (10). Said grid material comprises a series of intersecting baffle members molded together to form a plurality of spaced apart openings. A section of permeable synthetic filter material (16), the circumference of which is substantially equal to that of lower and upper filter members (12) and (14), is placed on top of and in direct contact with lower filter member (12). Upper filter member (14) is placed on top of filter material (16). Lower filter member (12), filter material (16) and upper filter member (14) are encased in a section of synthetic mesh or other screen material (18) and an opening is provided in the whole therethrough to receive bottom connector section (26).

It will be appreciated that lower and upper filter members (12) and (14) provide a uniform number of large fluid passageways through which aquarium water may circulate with minimal resistance thereby promoting a free and uniform movement of water through the in-tank aquarium filter (FIG. 1). It will also be appreciated that filter material (16) is capable of supporting the large colony of desireable bacteria necessary to provide effective biological filtration of the aquarium water. It will be further appreciated that air bubbles generated by the circulation of aerated water through the aquarium become trapped within the fibers of filter material (16) creating a source of passive aeration of the aquarium water as it continuously circulates through said filter material. Further, the openings in screen material (18) are of sufficient size to permit an unobstructed flow of water through the in-tank aquarium filter (FIG. 1) while still preventing aquarium gravel (36) from entering said filter.

Figure 3:
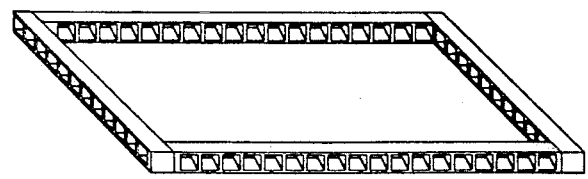
FIG. 3 is a perspective drawing of a frame utilized as a means of supporting the in-tank aquarium filter in FIG. 1 above the floor or bottom of a typical aquarium tank.
Figure 4:
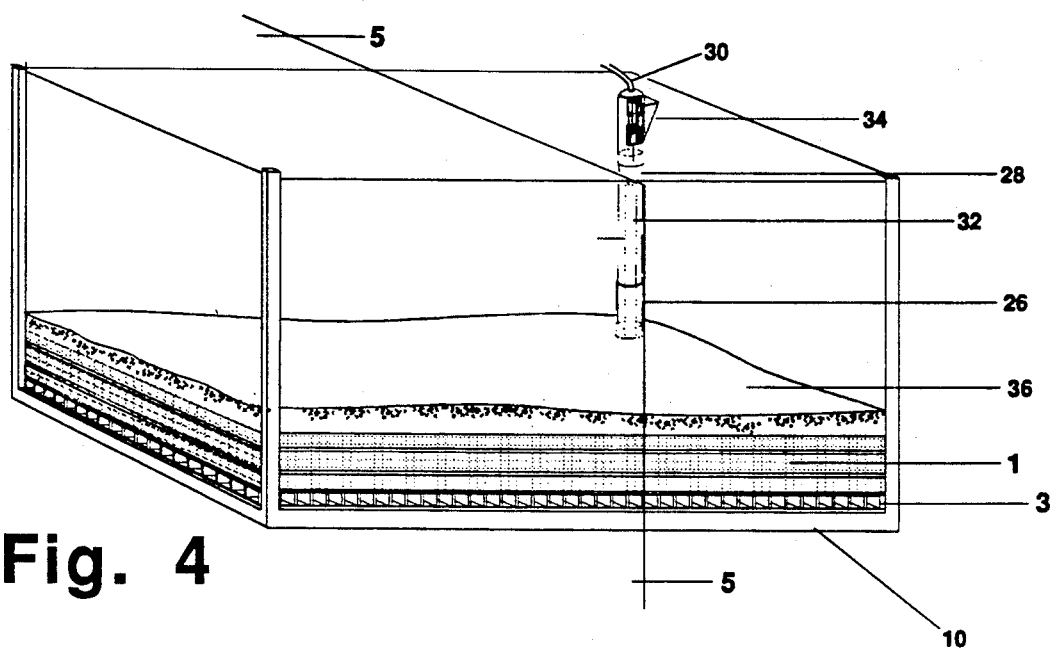
FIG. 4 is a perspective drawing of a typical aquarium utilizing the in-tank aquarium filter of the present invention.
Figure 5:
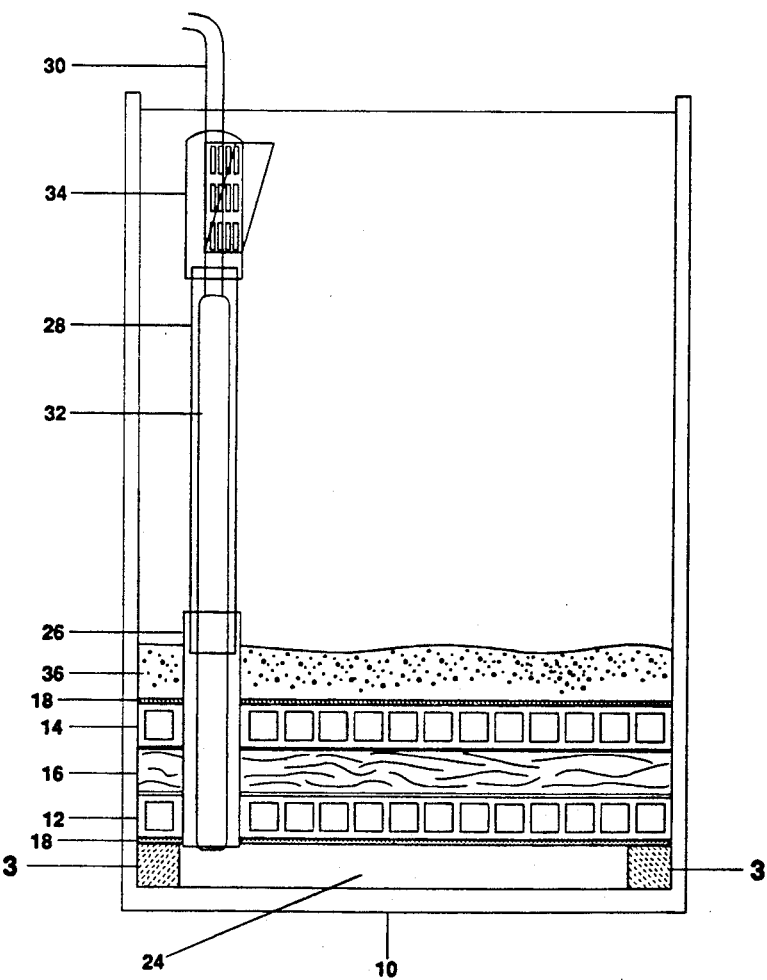
FIG. 5 is a detailed sectional view taken along section 5—5 of FIG. 4.

FIGS. 4 and 5 illustrate a typical aquarium setup utilizing the in-tank aquarium filter of the present invention. A means of supporting the aquarium filter (FIG. 1) above the floor or bottom of aquarium tank (10) is provided by four lengths of rigid synthetic grid material (said grid material having been previously described) which are cut, placed on edge and attached together so as to form a frame (FIG. 3) the circumference of which is substantially equal to the internal dimensions of aquarium tank (10). A means of aerating and recirculating water contained within aquarium tank (10) is provided by a conventional air pump assembly comprising bottom connector section (26), water/air carrying member (28), air tubing (30), airstone (32), upper connector section (34) and an external air pump (not illustrated). A layer of aquarium gravel (36) is dispersed across the top of the filter.

In a typical embodiment of the present invention as illustrated in FIGS. 4 and 5, the support frame (FIG. 3) is placed upon the floor of aquarium tank (10). The in-tank aquarium filter of the present invention (FIG. 1) is placed on top of and in direct contact with the support frame so that a fluid chamber (24) is formed in the interior region of said frame between said aquarium filter and the floor of the aquarium tank. Bottom connector section (26) is inserted into and through the opening provided in aquarium filter (FIG. 1), terminating in the upper region of fluid chamber (24).

Water/air carrying member (28) is fitted into bottom connector section (26). One end of a length of conventional air tubing (30) is fitted into airstone (32) and said airstone is inserted into water/air carrying member (28) and depended therein so as to pass through bottom connector section (26) and terminate in the upper region of fluid chamber (24). The opposite end of air tubing (30) passes through an opening in the top of upper connector section (34) and is connected to an external air pump (not illustrated). Upper connector section (34) is fitted onto water/air carrying member (28). A layer of aquarium gravel (36) is dispersed across the top surface of the aquarium filter (FIG. 1). When aquarium tank (10) is filled with water, the water level within water-/air carrying member (28) is equal to that within said aquarium tank. When the external air pump is activated, air is forced through air tubing (30) and through airstone (32) to mix with water in water/air carrying member (28). The buoyancy of the resultant water/air mixture forces the aerated water upward through water/air carrying member (28) and back into the aquarium through outlet ports in upper connector section (34). The upward movement of aerated water within water-/air carrying member (28) produces a partial vacuum in fluid chamber (24) causing water to be drawn from said chamber into said water/air carrying member. In this manner water is continuously recirculated throughout aquarium tank (10).

From a study of the foregoing descriptive text and accompanying drawings the reader will observe that the in-tank aquarium filter of the present invention provides for complete circulation of the aquarium water by permitting said water to flow freely and uniformly through said filter. It will also be observed that the filter provides for passive aeration of the aquarium water, thus greatly increasing the available oxygen within said water allowing for a greater number of animals to be placed within the aquarium and maintained in good health. A further advantage of the filter is that is supports the large colony of desireable bacterial growth necessary to achieve effective biological filtration resulting in a significant decrease in aquarium tank break-in time. It will also be appreciated that if it becomes necessary to completely dissassemble the aquarium to effect repairs to the tank, the break-in time *does not* need to be repeated since the filter may be placed in an alternate water-filled receptacle to maintain the aforementioned bacterial colony and reintroduced to the tank when the repairs have been completed.

The in-tank aquarium filter of the present invention has additional advantages in that it provides for complete removal of undissolved waste materials and other solid contaminants from the aquarium water thus preventing such particulate matter from accumulating within the aquarium to become trapped in the aquarium gravel;

it decreases the frequency and degree of aquarium tank maintenance by providing for more complete removal of waste material and debris from the aquarium water;

it can be easily and inexpensively manufactured and adapted for use in aquariums of any configuration;

it is effective in both fresh water and saltwater aquarium applications.

While only one preferred embodiment of the present invention has been described, it is also apparent that numerous changes and modifications can be made without departing from the spirit of the invention. For example, a "powerhead" pump assembly may be utilized in lieu of an air pump assembly as an alternate means of recirculating and aerating the aquarium water. In another embodiment, the filter may be used in conjunction with currently available undergravel devices and/or external aquarium filter devices to improve the effectiveness thereof. Still other embodiments may utilize upper and lower filter members comprised of an alternate type of grid material.

Thus, the scope of the invention should be determined by the appended claims and their legal equivalents, rather than by the examples given.

I claim:

1. For an aquarium with water, an in-tank aquarium filter for placement within the aquarium tank, said filter comprising:

a section of synthetic screen material surrounding a lower filter member and an upper filter member, said filter members interposed by a section of permeable synthetic filter material;

said filter members comprising a series of intersecting baffle members defining a plurality of uniformly spaced fluid passageways;

means of supporting said filter members above the floor of said aquarium tank;

means for causing aquarium water to be aerated and continuously recirculated through said filter members.

* * * * *